(No Model.) 6 Sheets—Sheet 1.
A. COTTRAU.
BRIDGE, PIER, AND SIMILAR STRUCTURES.
No. 337,666. Patented Mar. 9, 1886.
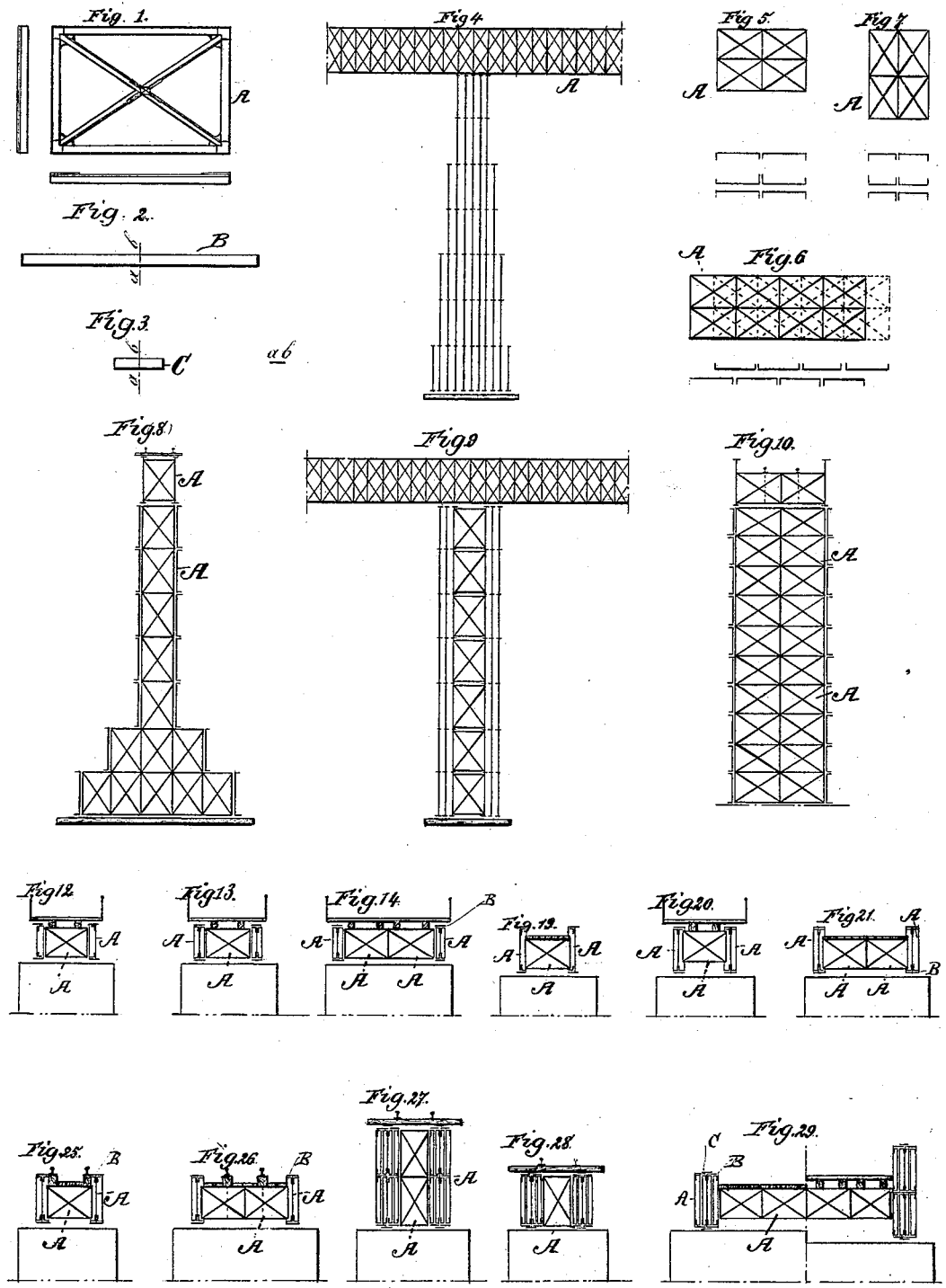
Witnesses,
Dennis Sumby.
Robert Everett.
Inventor,
Alfred Cottrau.
By James L. Norris.
Atty.

(No Model.) 6 Sheets—Sheet 2.
A. COTTRAU.
BRIDGE, PIER, AND SIMILAR STRUCTURES.
No. 337,666. Patented Mar. 9, 1886.
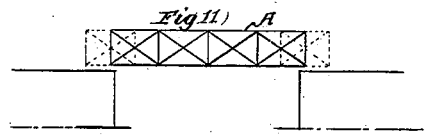
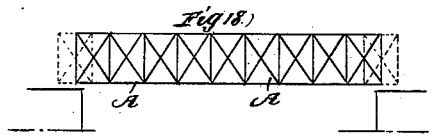
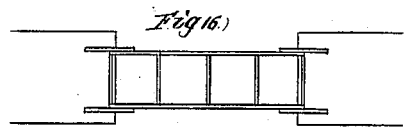
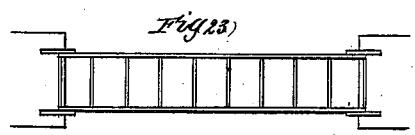
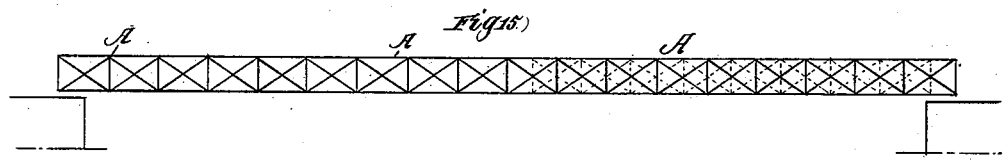
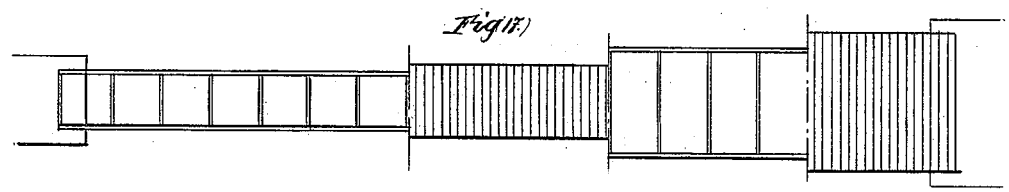
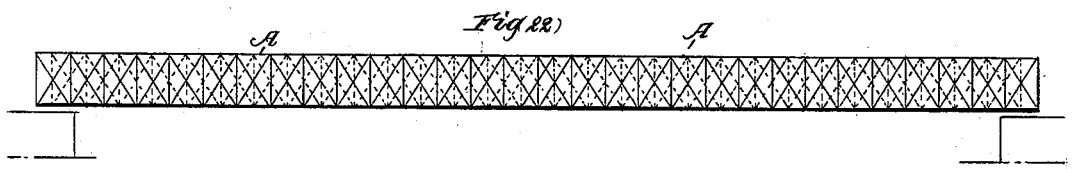
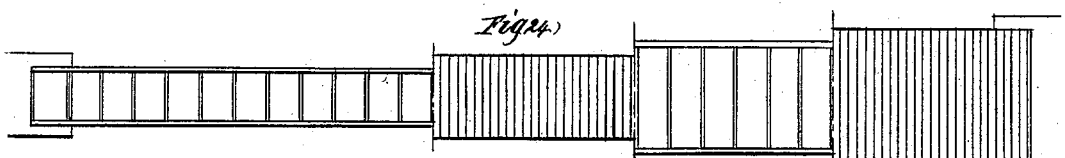
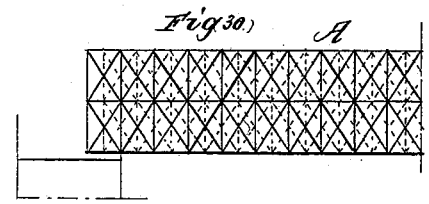
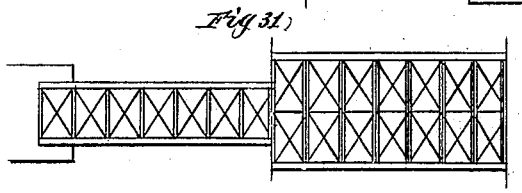
Witnesses.
Dennis Sumby.
Robert Everett.
Inventor,
Alfredo Cottrau,
By James L. Norris.
Atty.

(No Model.) 6 Sheets—Sheet 3.
A. COTTRAU.
BRIDGE, PIER, AND SIMILAR STRUCTURES.
No. 337,666. Patented Mar. 9, 1886.
*Fig.32.ª* *Fig.32.*
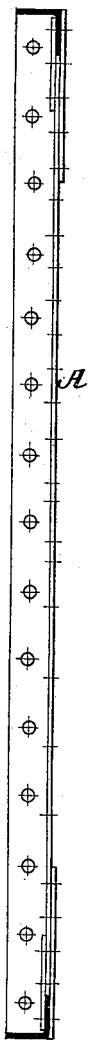
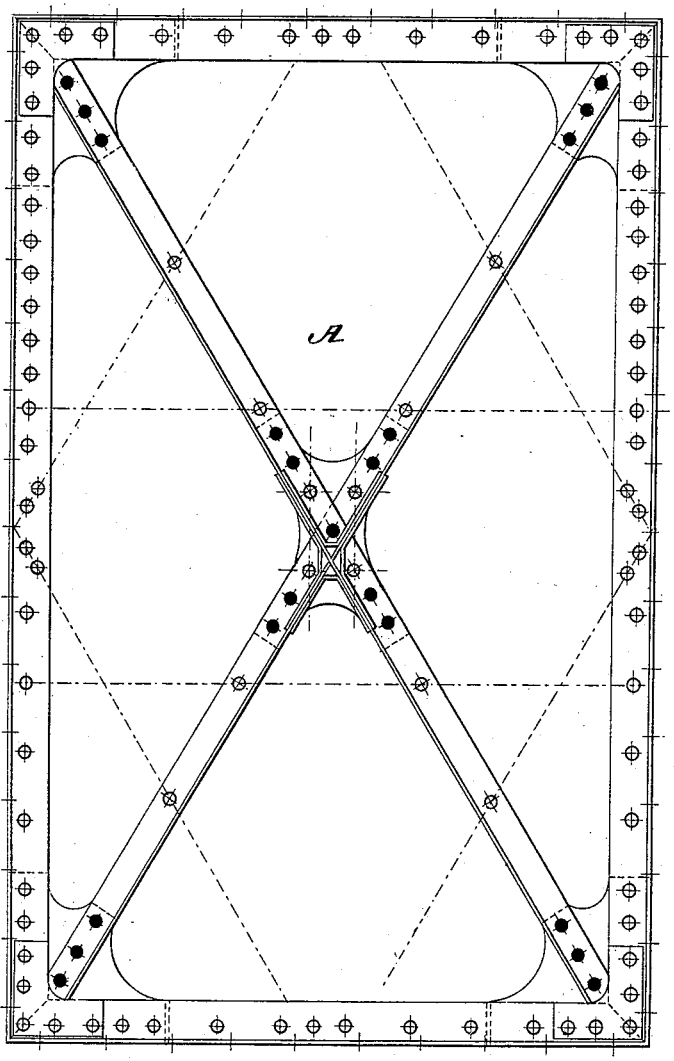
*Fig.32.ᵇ*
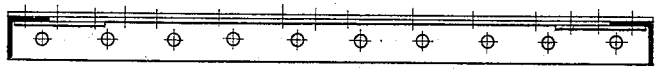
Witnesses
Geo. W. Rea.
Robert Everett
Inventor.
Alfred Cottrau.
By James L. Norris
Atty.

(No Model.) 6 Sheets—Sheet 4.
A. COTTRAU.
BRIDGE, PIER, AND SIMILAR STRUCTURES.
No. 337,666. Patented Mar. 9, 1886.
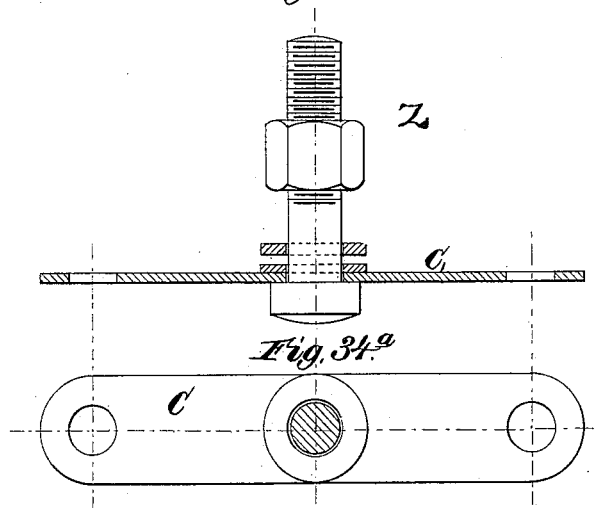
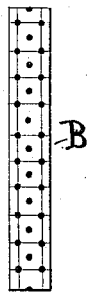
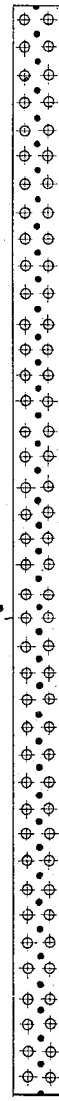

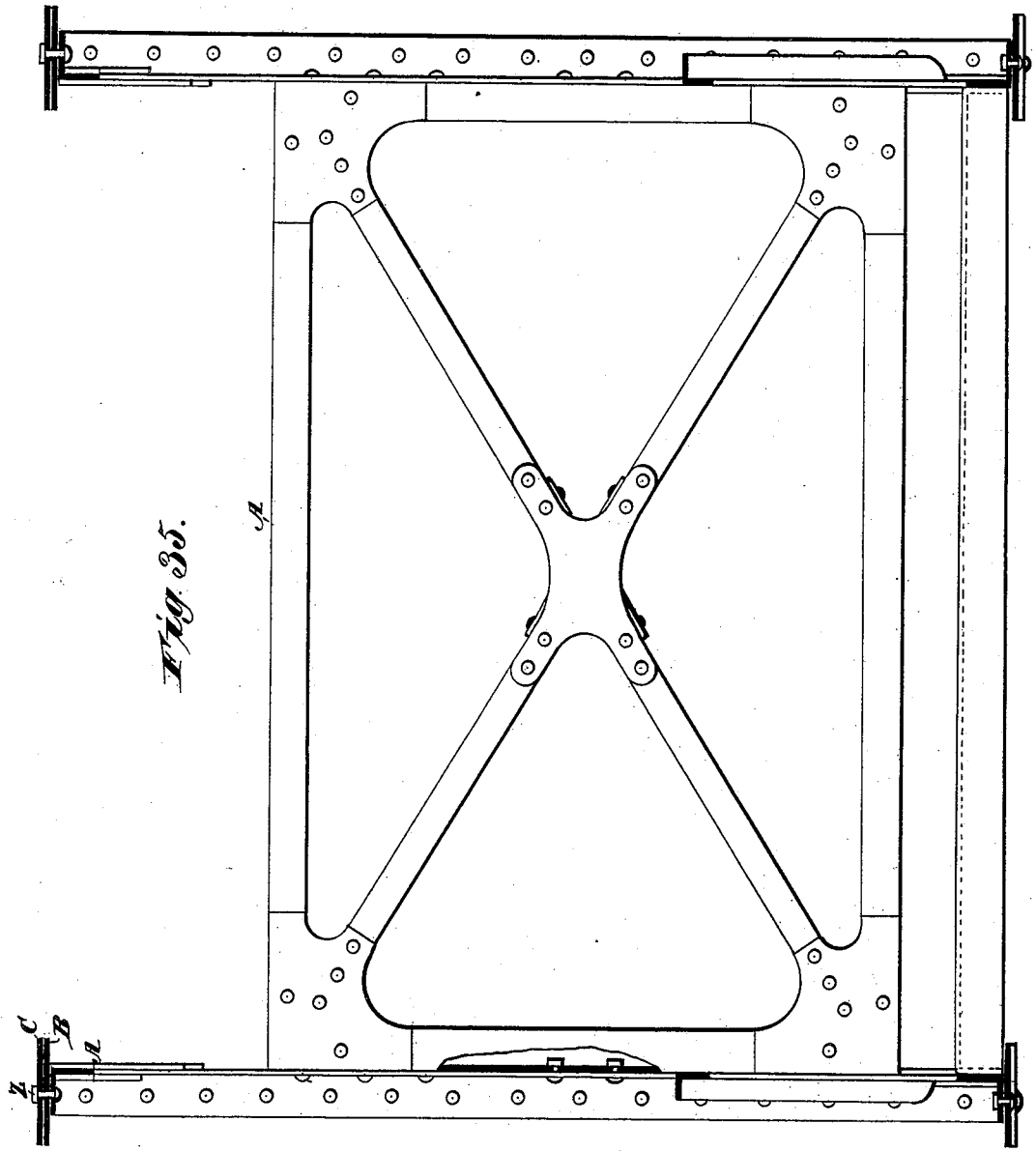

(No Model.) 6 Sheets—Sheet 6.
A. COTTRAU.
BRIDGE, PIER, AND SIMILAR STRUCTURES.
No. 337,666. Patented Mar. 9, 1886.
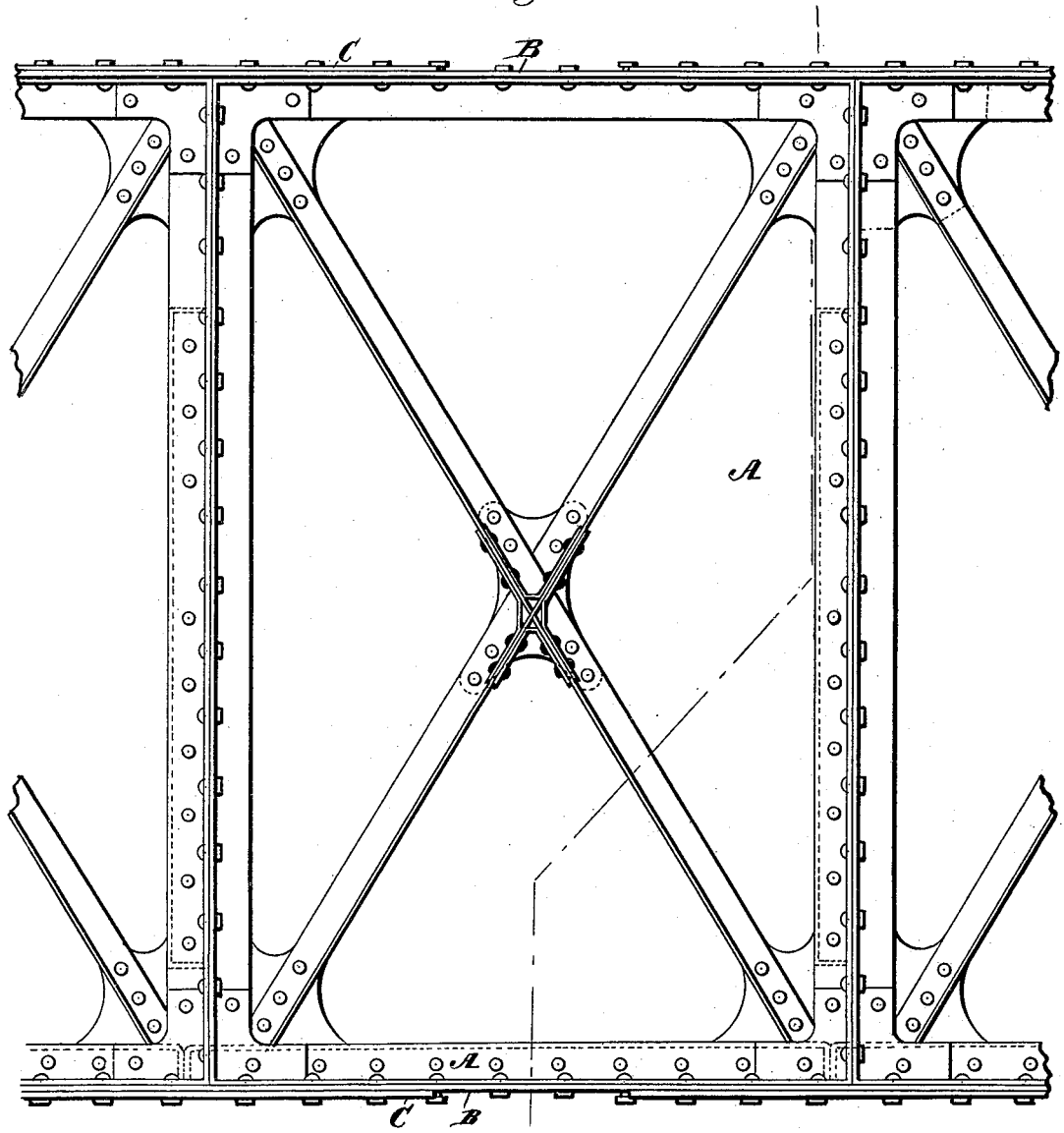

UNITED STATES PATENT OFFICE.

ALFREDO COTTRAU, OF NAPLES, ITALY.

BRIDGE, PIER, OR SIMILAR STRUCTURE.

SPECIFICATION forming part of Letters Patent No. 337,666, dated March 9, 1886.

Application filed August 13, 1884. Serial No. 140,462. (No model.) Patented in England July 8, 1884, No. 9,926, and in Italy May 21, 1884, No. 16,825.

*To all whom it may concern:*

Be it known that I, COMMANDER ALFREDO COTTRAU, a subject of the King of Italy, and a resident of Naples, Italy, civil engineer, have invented new and useful Improvements in and Relating to Bridges, Piers, and Similar Structures, for which I have applied for provisional protection in Great Britain on the 8th day of July, 1884, No. 9,926, and for which I have obtained a patent in Italy, No. 16,825, bearing date May 21, 1884, of which the following is a specification, reference being had to the accompanying drawings.

This invention relates to bridges, piers, and similar structures, which, whatever be their dimensions and resistance, are made up or built of a number of rectangular elements or parts made of iron or steel, and all alike in shape and size. These elements or parts are placed one above another, or partially connected with each other, or arranged perpendicularly or obliquely with respect to each other, and they thus form very rigid bridges of trellis-work or open-work whose height, length, width, and resistance can be varied as desired.

To enable me to vary the resistance of this system without being obliged to augment the height of the aforesaid elements or parts of which the main girders are composed, I employ other elements or parts in the construction of these bridges, which elements or parts consist of iron or steel plates, one of which serves as a tie-rod or connecting-piece, and the other and shorter one as a cover-plate for the joints, or as a gusset or strengthening-piece for the first-named elements or parts upon the supports in order to increase the resistance to the crushing thereof.

In the accompanying drawings, Figure 1 shows a rectangular element or part, A. Fig. 2 shows an element or part, B, to serve as a tie-rod or connecting-piece. Fig. 3 shows an element or part, C, to serve as a cover-plate for the joints. Fig. 4 shows the application of my invention to the construction of a metal pier. Figs. 5, 6, and 7 illustrate different modes of combining the elements or parts A. Figs. 8, 9, and 10 show other applications to the construction of metal piers. Fig. 11 shows a bridge whose principal girders are formed by the elements or parts A, arranged longitudinally. Figs. 12, 13, and 14 are transverse sections through a bridge of this type. Fig. 15 is a general elevation of a bridge for variable spans, and with the elements or parts A laid either simply end to end, or doubled, or one overlapping another, the joints either coinciding or being shifted longitudinally. Fig. 16 is a plan of a bridge of the type shown in Fig. 11. Fig. 17 is a plan of a bridge of the type shown in Fig. 15. Fig. 18 shows a bridge with the elements or parts A placed vertically. Figs. 19, 20, and 21 are transverse sections through a bridge of the type shown in Fig. 18. Fig. 22 is a general elevation of a bridge for variable spans and with the elements or parts A placed vertically, and either simply side by side, or doubled, or overlapping, the joints either coinciding or being shifted longitudinally. Fig. 23 is a plan of a bridge of the type shown in Fig. 18. Fig. 24 is a plan of a bridge of the type shown in Fig. 22. Figs. 25, 26, and 28 are different transverse sections of bridges for railways, of which the general elevation is also illustrated by Figs. 11 and 22. Fig. 27 is a transverse section of a railway-bridge with a large span. (For still greater spans the number of elements or parts A may be augmented.) Fig. 29 shows by its left-hand portion a transverse section of a bridge of great width, (this width can be increased by the addition of other elements or parts, A, B, and C,) and by its right-hand portion a transverse section of a bridge of great width and large span. Fig. 30 is a general elevation of a bridge of the type shown in Fig. 27 or in the right-hand half of Fig. 29. Fig. 31 is a plan of a bridge of either of the types shown in Figs. 25, 26, 27, and 28. In this plan it will be observed that the elements or parts A are employed as horizontal cross-ties. Figs. 32, 32ª, and 32ᵇ represent the element A in plan and section. Figs. 33 and 33ª are face views of the element B. Figs. 34 and 34ª are sections and face views of the element C. Fig. 35 is a transverse section of part of a bridge in which the component elements are shown on a large scale and are connected with each other. Fig. 36 is a side elevation of the form of bridge also shown in Fig. 35.

The first element or part, A, is of rectangular form, as is shown in Figs. 1, 32, 32$^a$, and 32$^b$, and has its surface and margin perforated or provided with bolt or rivet holes. The second element or part, B, has the form shown in Figs. 2, 33, and 33$^a$, and consists of an iron or steel plate perforated in such a manner as to adapt it for attachment to either the long or the short side of the rectangular part A. The third element or part, C, (which is used as a cover-plate, gusset, rib, or strengthening-piece,) is represented by Fig. 3, and can be applied in any position to the elements or parts A and B either on the exterior of the ribs of the element A or on the inside, or extending in a transverse direction. It is evident that the rectangular elements, whether strengthened or not, according to requirements by the elements B and C, can be connected with each other in a great many different manners—for instance, as indicated in Figs. 5 to 31.

All the elements or parts are united by means of bolts Z when the bridge is designed for temporary use, so that it can be taken to pieces and re-erected in another place; but when it is to be a permanent structure rivets can be substituted for the bolts, said bolts or rivets being passed through the holes made in the elements A B C, to hold the latter together. It will thus be seen that by employing a number of the above-named three elements or parts, which for each group or series are all alike, and a suitable number of bolts, (which, if required, may also be alike,) a bridge can be erected which has any desired span, width, and resistance, whatever purpose it is to serve—for instance, as a foot way for pedestrians, or for any ordinary thoroughfare, or for ordinary railway traffic—the greatest rigidity and stability being obtained in each case, and the elements or parts A can be employed as main girders, small girders, beams, and cross-ties, and these bridges may be either temporary or permanent structures.

In the accompanying drawings some of the principal applications of this system are illustrated. These applications may be greatly varied apart from the fact that, by reason of the different manners in which the elements or parts may be arranged, it is possible to construct bridges with several continuous bays, which cannot be effected with the type of portable bridges heretofore employed. With the elements or parts A, B, and C piers or framework having a great height and great rigidity may also be built. Moreover, the weight of each of these elements or parts being, relatively speaking, very small, they can be easily carried by a man, and constitute a really useful mechanical structure, which in many cases is indispensable for war purposes and for the construction of temporary passages to be employed instantaneously either for the lines of railways in use or for those in course of construction, or for an ordinary thoroughfare or foot-way.

It must be remarked that a characteristic feature of this system is that, by means of the arrangement or combination of the elements or parts A B C, the moment of inertia of the main girders can be proportioned in accordance with the moments and the strains or stresses, which are produced under the effect of those loads which it is designed to bear, so that when the span or the width of the bridge is to be increased there is no necessity for diminishing the load, as is the case with all other systems, which always have the same moment of inertia for the principal girders without its being possible to increase it in any manner.

With a number of the three elements or parts A B C a bridge may at any time be erected of any desired span, width, and resistance on the shortest notice, and piers or intermediate supports may likewise be built for the said bridges in cases where the subdivision of the structure into a number of spans is of importance.

The element or part A is rectangular, and is provided with diagonals. It is flat on one side and all the ribs are on the other side. The element or part B consists of a plate formed with holes, which correspond with those in the outer sides of the element or part A, and the element or part C is also a plate and can be used as a cover-plate for the joints, in combination with the elements or parts A or B—or as a connecting-plate for these elements or parts. These three parts are of iron or steel.

What I claim is—

1. In the construction of bridges, the combination of the series of separate rectangular flat elements, A, the straight plates B, and the cover-plates C, constructed substantially as and for the purpose described.

2. In the construction of girders, the combination of the series of separate rectangular flat elements A, having the diagonals, the flat plates B, secured to the sides thereof, and the cover-plates C, the whole constructed substantially as and for the purpose described.

In testimony whereof I have hereunto signed my hand in the presence of two subscribing witnesses.

ALFREDO COTTRAU.

Witnesses:
F. G. HAUGHWOUT,
ROBT. O. N. WICKERSHEY.